United States Patent [19]

Tsumura

[11] Patent Number: 5,710,795
[45] Date of Patent: Jan. 20, 1998

[54] RECEIVED SIGNAL DECISION APPARATUS FOR DIGITAL MODULATED SIGNAL RECEIVER

[75] Inventor: Soichi Tsumura, Tokyo, Japan

[73] Assignee: NEC Corporation, Tokyo, Japan

[21] Appl. No.: 502,057

[22] Filed: Jul. 14, 1995

[30] Foreign Application Priority Data

Jul. 15, 1994 [JP] Japan ................... 6-164424

[51] Int. Cl.$^6$ ........................... H04L 27/22
[52] U.S. Cl. ........................... 375/317; 375/346
[58] Field of Search ..................... 375/317, 346

[56] References Cited

U.S. PATENT DOCUMENTS 5,122,758   6/1992   Tomita ................... 375/328

*Primary Examiner*—Melvin Marcelo
*Attorney, Agent, or Firm*—Sughrue, Mion, Zinn, Macpeak & Seas, PLLC

[57] ABSTRACT

A received signal strength detector detects a received signal strength corresponding to an envelope of a received signal and outputs a received strength signal corresponding to the strength level. A DC component extracting filter extracts a DC component from the received strength signal and outputs an extracted DC component signal corresponding to the level of the DC component. A modulation rate component extracting filter extracts a line spectrum component corresponding to a modulation rate from the received strength signal and outputs an extracted modulation rate component signal corresponding to the level of the modulation rate component. A decision circuit compares the extracted DC component signal and the extracted modulation rate component signal to respective threshold levels set therefor and decides, when the levels of the two signals are higher than the respective threshold levels, that the received signal is an optimum signal. The decision may otherwise be based on comparison of a ratio between the two extracted signals with a threshold level set therefor.

11 Claims, 2 Drawing Sheets

RECEIVED SIGNAL DECISION APPARATUS FOR DIGITAL MODULATED SIGNAL RECEIVER

BACKGROUND OF THE INVENTION

1. Field of the Invention

This invention relates to a digital modulated signal receiver, and more particularly to a carrier detector for a linear digital modulated signal receiver.

2. Description of the Related Art

It is important to measure the signal strength of a received signal to detect a carrier particularly when signals from a plurality of base stations are received and it is necessary to select an optimum signal from among the received signals as with a terminal station in mobile communications. FIG. 1 is a block diagram showing the construction of a conventional carrier detector. Received signal 101 is inputted to received signal strength detector 2, from which received signal 103 and received strength signal 104 are outputted. A logarithmic amplifier or the like is used for received signal strength detector 2. Received strength signal 104 is produced by signal conversion based on a control signal (for example, gain control signal) in the logarithmic amplifier for securing a logarithmic linearity of the amplifier. The received strength signal 104 is generally called RSSI (Received Signal Strength Indicator). DC component extracting filter 3 receives received strength signal 104 and extracts DC component 105 of received strength signal 104. Decision 8 compares a voltage value corresponding to DC component 105 with a predetermined level and outputs decision signal 108 which represents whether or not the strength of the received signal is sufficiently high.

With the conventional method described above, however, only the field strength of a received signal is measured. If the received signal is a signal of a different modulation rate or is a signal whose demodulation is difficult due to cochannel interference or by some other cause, the signal may be determined to be an optimum signal in error if the received signal has a sufficiently high field strength. Accordingly, an optimum received signal is not necessarily selected.

Further, if the received signal is so strong as to put the receiver into a saturated condition in which the receiver cannot demodulate the received signal, the received signal may possibly be selected as it is, resulting in error in selection of an optimum received signal. This is because a decision is made merely whether or not the field strength of the received signal is higher than a certain level. A countermeasure to this problem is disclosed, for example, in Japanese Patent Laid-Open Application No. 343547/92. In the device disclosed, when the field strength of a received signal is higher than a certain level, the output of the received signal is attenuated by an attenuator to a level with which the receiver is not saturated. In this instance, however, the result of detection of the received signal strength must have a monotonous increasing characteristic with respect to the received signal level. In particular, the monotonous increasing characteristic is lost if the receiver is saturated. Therefore, whether the RSSI output level exhibits a condition that the output of the received signal is fully saturated with respect to a certain RSSI output level or another condition when the output of the received signal is not saturated as yet is uncertain. Accordingly, the prior art method has a problem in that, since it cannot be decided whether the RSSI output level in a fully saturated condition, or simply in a saturated condition it cannot be determined how the attenuator should be controlled. Consequently, with the prior art method, an optimum received signal is not necessarily selected.

SUMMARY OF THE INVENTION

It is an object of the present invention to provide a received signal decision apparatus which, can select an optimum received signal or can detect that a receiver is in a saturated condition and prevent the saturated condition of the receiver eliminating the problems of the conventional received signal decision apparatus for a digital modulated signal receiver described above.

In a first aspect of the present invention, a received signal decision apparatus for a digital modulated signal receiver comprises a received signal strength detecting means for detecting a received signal strength corresponding to an envelope of a received signal and outputting a received strength signal, a DC component extracting filter for extracting a DC component of the received strength signal, a modulation rate component extracting filter for extracting a modulation rate component of the received strength signal, and a decision means for deciding based on the DC component and the modulation rate component of the received strength signal whether or not the received signal is optimum. The decision of the decision means may be based on the relationship between the DC component and the modulation rate component of the received signal described above, and it may decide that the received signal is optimum, for example, (1) when both the DC and modulation rate components are higher than certain respective threshold levels, or (2) when the (modulation rate component)/(DC component) is higher than a certain threshold level, or when the DC component or the (modulation rate component)/(DC component) is lower than another certain threshold level, but in any other case, it decides that the received signal is not optimum.

The received signal decision apparatus may further comprise an attenuator provided on the input side of the received signal strength detecting means. In this instance, the decision means may decide that the received signal is not optimum, for example, (3) when the DC component is higher than a threshold level and the modulation rate component is lower than another threshold level or (4) when the (modulation rate component)/(DC component) is lower than a certain threshold level, or when the DC component or the (modulation rate component)/(DC component) is higher than another certain threshold level. The decision means may control the attenuator to lower the gain of the receiver so that the output of the receiver may not be saturated, but in any other case, and the decision means decides that the received signal is optimum.

Further, where a plurality of candidates are present as alternative signals to be received, the decision means may calculate a ratio of the DC component to the modulation rate component of the received strength signal or a reciprocal ratio to the ratio for each of the candidates and decide that that one of the alternative signals whose ratio exhibits the highest value or whose reciprocal rate exhibits the lowest value is optimum as the received signal.

In a second aspect of the present invention, a received signal decision apparatus for a digital modulated signal receiver comprises a received signal strength detecting means for detecting a received signal strength corresponding to an envelope of a received signal and outputting a received strength signal, a DC component extracting filter for extracting a DC component of the received strength signal, a modulation rate component extracting filter for extracting a modulation rate component of the received strength signal, an attenuator provided on the input side of the received signal strength detecting means, and control means for controlling the attenuator in response to the DC component and the modulation rate component of the received strength signal. The control means continuously controls the output of the attenuator in accordance with the value of a ratio of the DC component to the modulation rate component of the received strength signal to prevent saturation of the output of the receiver. The control means decision is based on the output of the receiver as a result of the control of the attenuator whether or not the received signal is optimum.

DETAILED DESCRIPTION OF THE PREFERRED EMBODIMENTS

Embodiments of the present invention are described below with reference to the drawings.

Figure 1:
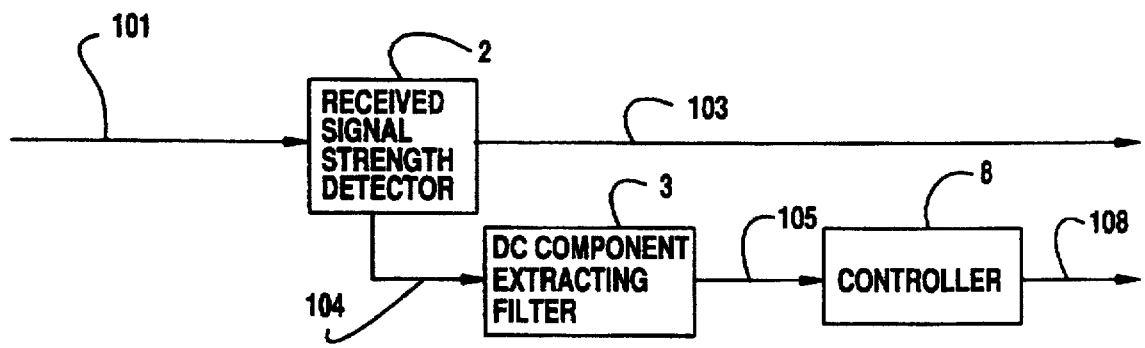
FIG. 1 is a block diagram showing the construction of a conventional received signal decision apparatus for a digital modulated signal receiver.
Figure 2:
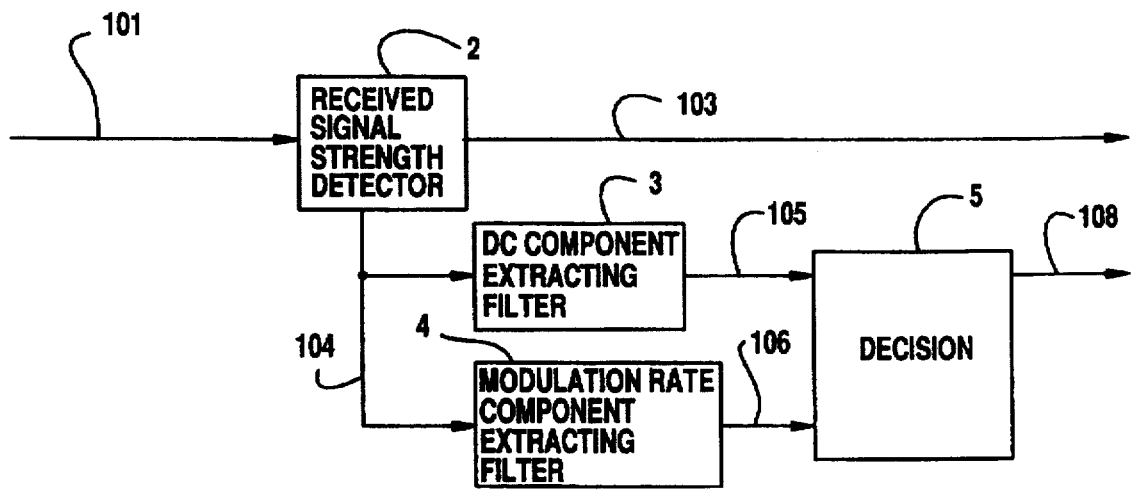
FIG. 2 is a block diagram illustrating the construction of an embodiment of the present invention.

FIG. 2 is a block diagram showing an embodiment of a received signal decision apparatus for a digital modulated signal receiver of the present invention. Referring to FIG. 2, a received signal strength detector 2 produces received strength signal 104 and a second received signal 103 from received signal 101 inputted thereto. Received strength signal 104 is outputted as an RSSI detected in accordance with an envelope of received signal 101 to a DC component extracting filter 3 and modulation rate component extracting filter 4. DC component extracting filter 3 is constituted using a low-pass filter (LPF) and extracts a DC component of received strength signal 104 and outputs to decision means 5 an extracted DC component signal 105 having an output level (voltage value or current value) corresponding to the extracted DC component. Meanwhile, modulation rate component extracting filter 4 is constituted from a band-pass filter (BPF) and a detector and extracts a line spectrum component corresponding to a modulation rate of received strength signal 104 and outputs to decision means 5 an extracted modulation rate component signal 106 having an output level (voltage value or current value) corresponding to the modulation rate component. Decision means 5 then compares the output level of extracted DC component signal 105 with a predetermined threshold level. When the output level of extracted DC component signal 105 is higher than the threshold level and when the output level of extracted modulation rate component signal 106 is higher than another predetermined threshold level, the decision means 5 decides that received signal 101 is an optimum received signal and outputs decision signal 108 representing a result of the decision.

It is to be noted that the decision of decision 5 may be based either on the method described above wherein the output levels of extracted component signals 105 and 106 are individually compared with respective suitable levels (threshold levels) or on another method wherein whether a received signal is optimum is based on the relationship between a modulation rate component and a DC component such that the received signal is decided optimum when (a) the (modulation rate component)/(DC component) is higher than a certain threshold level, or (b) the DC component or the (modulation rate component)/(DC component) is lower than another certain threshold level, but that in any other case the received signal is not optimum. In particular, while, according to the prior art, only the field strength is detected through an RSSI (output level of extracted DC component signal 105), according to the present invention, the ratio of the output level of extracted modulation rate component signal 106 to the output level of extracted DC component signal 105, or the reciprocal ratio, is detected, and the characteristic that the ratio exhibits a low value when the output level of extracted modulation rate component signal 106 is in a fully saturated condition is utilized. Thus, the ratio of the output level of extracted modulation rate component signal 106 to the output level of extracted DC component signal 105, or the reciprocal ratio, is observed and compared with a respective predetermined threshold level. As a result of the comparison, it can be decided appropriately whether a certain RSSI output level exhibits a condition in which the output of the received signal is in a fully saturated condition or another condition in which the output of the received signal is not in a fully saturated condition.

Figure 3:
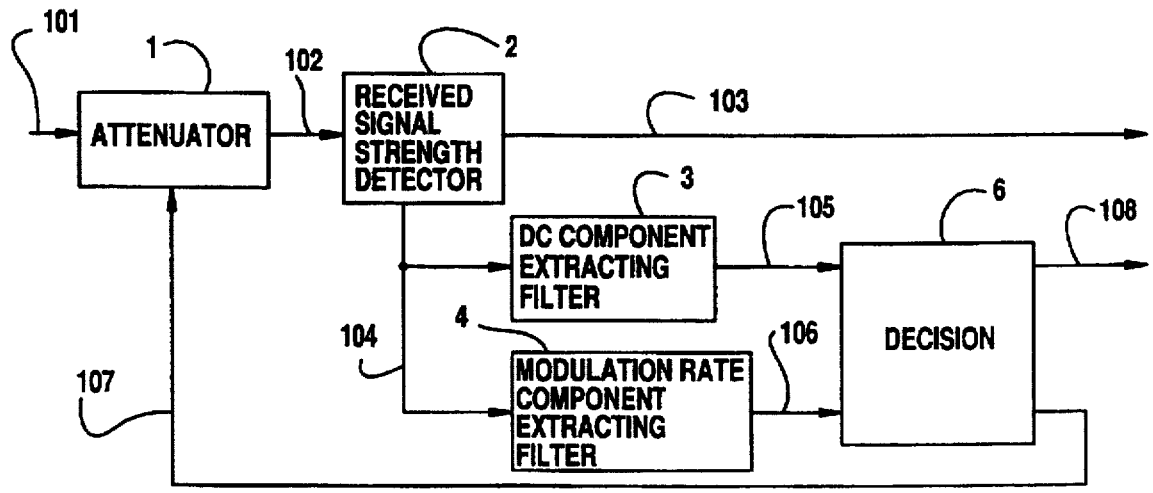
FIG. 3 is a block diagram illustrating the construction of another embodiment of the present invention.

Another embodiment of the present embodiment is described below with reference to FIG. 3.

Received signal 101 is inputted to received signal strength detector 2 by way of attenuator 1. Further, decision means 6 outputs decision signal 108 and further outputs control signal 107 for controlling attenuator 1 in accordance with a result of decision of decision means 6 to attenuator 1. The other construction and operation of the present embodiment are similar to those described hereinabove with reference to FIG. 2. In one instance, decision means 6 decides a received signal in the following manner. In particular, when extracted DC component signal 105 is higher than a predetermined threshold level and extracted modulation rate component signal 106 is lower than another predetermined threshold level, decision means 6 decides that the received signal is not optimum, and outputs control signal 107 to increase the attenuation amount of attenuator 1 to lower the gain of the receiver thereby eliminating an otherwise possible saturated condition of the output of the receiver. Using this result, decision of whether or not the received signal is optimum is performed similarly to the first embodiment described above. Further, in another instance, decision means 6 decides that the received signal is not optimum when (c) the (modulation rate component)/(DC component) is lower than a certain threshold level, or (d) the DC component or the (modulation rate component)/(DC component) is higher than another certain threshold level.

The saturated condition of the output of the receiver is eliminated in a similar manner. In any other case, decision means 6 decides that the received signal is optimum. The basis of the operation of decision means 6 in those cases is similar to that in the first embodiment. In the second embodiment, since control signal 107 takes both a modulation rate component and a DC component into consideration, the monotonous increasing characteristic of the amplifier in received signal strength detector 2 need not be taken into consideration, and consequently, a stable optimum received signal can be obtained.

Further, as a modification to the embodiments described above, where a plurality of candidates are present as alternative signals to be received, it is possible to employ a method in which the ratio of extracted DC component signal 105 to extracted modulation rate component signal 106, or the reciprocal ratio, is calculated for each of the alternative signals. The alternative signal which exhibits the highest value or the lowest value, respectively, is determined as an optimum signal as received signal 101.

Figure 4:
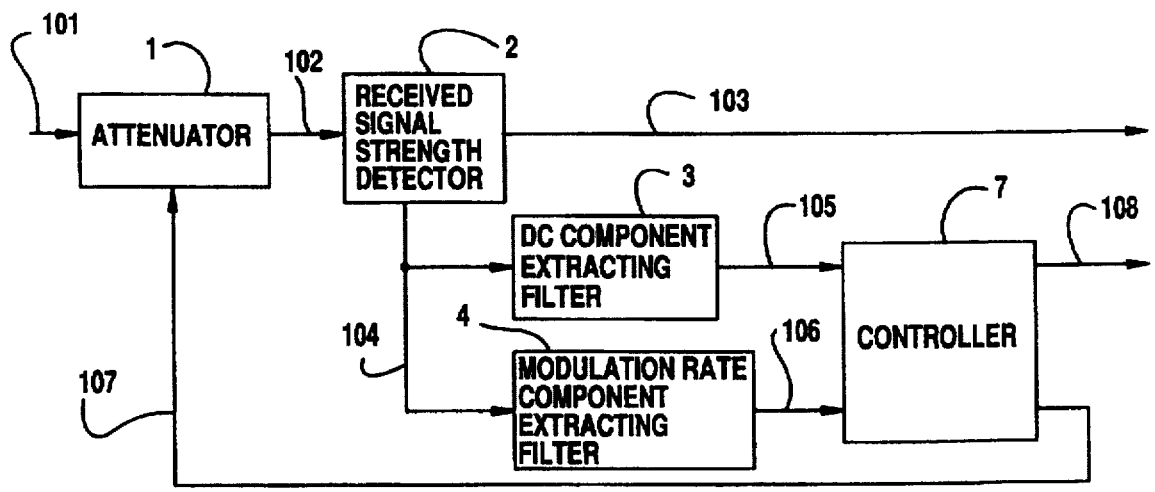
FIG. 4 is a block diagram illustrating the construction of a further embodiment of the present invention.

While the decision operations in the embodiments described above are all based on on-off control between upper and lower ranges with respect to a certain threshold level, another decision method may alternatively be employed. In particular, controller 7 is employed as shown in FIG. 4. In this instance, the controller 7 controls the attenuator so that, for example, the attenuation amount of the attenuator has such a continuous variation that it increases in proportion to or in reciprocal proportion to the ratio of the DC component to the modulation rate component, and, based on a result of the control, it is decided by controller 7 whether or not the received signal is optimum.

As described above, according to the present invention, a received signal which has a sufficiently high signal strength but is difficult to demodulate due to a difference in modulation rate or due to cochannel interference can be decided. Further, according to the present invention, even if the receiver is in a saturated condition and cannot perform demodulation, the received signal can be attenuated without the necessity for a monotonous increasing characteristic of the received signal strength detection result with respect to the received signal level.

Accordingly, it is possible to receive signals from a plurality of base stations and select an optimum signal from among the received signals as with a terminal station for mobile communications.

What is claimed is:

1. A received signal decision apparatus for a digital modulated signal receiver, comprising:

received signal strength detecting means for detecting a received signal strength corresponding to an envelope of a received signal and outputting a received strength signal;

a DC component extracting filter for extracting a DC component of the received strength signal;

a modulation rate component extracting filter for extracting a modulation rate component of the received strength signal; and decision means for deciding whether the received signal is optimum based on the extracted DC component and the extracted modulation rate component of the received strength signal.

2. A received signal decision apparatus as claimed in claim 1, wherein said decision means compares the DC component and the modulation rate component of the received strength signal with respective threshold levels and decides that the received signal is optimum when both of the DC component and the modulation rate component are higher than the respective threshold levels.

3. A received signal decision apparatus as claimed in claim 1, wherein said decision means compares a ratio of the modulation rate component to the DC component of the received strength signal with a predetermined threshold level and decides that the received signal is optimum when the ratio is higher than the predetermined threshold level.

4. A received signal decision apparatus as claimed in claim 1, further comprising an attenuator provided at an input of said received signal strength detecting means, and wherein said decision means decides, when the DC component of the received strength signal is higher than a threshold level set therefor and the modulation rate component is lower than another threshold level set therefor, that the received signal is not optimum, said detecting means controlling said attenuator to lower the gain of said receiver so that the output of said receiver may not be saturated, but said detecting means deciding, in any other case, that the received signal is optimum.

5. A received signal decision apparatus as claimed in claim 1, further comprising an attenuator provided at an input of said received signal strength detecting means, and wherein said decision means compares a ratio of the modulation rate component to the DC component of the received strength signal with a predetermined threshold level, said decision means controlling said attenuator to lower the gain of said receiver when the modulation rate component is less than the predetermined threshold level so that the output of said receiver may not be saturated, and said decision means deciding whether the received signal is optimum based on the output of said receiver as a result of the control.

6. A received signal decision apparatus as claimed in claim 1, wherein said decision means calculates, where a plurality of alternative signals are present to be received, a ratio of the DC component to the modulation rate component of the received strength signal and decides that one of the alternative signals whose ratio exhibits the highest value is optimum.

7. A received signal decision apparatus as claimed in claim 1, wherein said decision means compares a ratio of the DC component to the modulation rate component of the received signal with a predetermined threshold level and decides that the received signal is optimum when the ratio is lower than the predetermined threshold level.

8. A received signal decision apparatus as claimed in claim 1, further comprising an attenuator provided at an input of said received signal strength detecting means, and wherein said decision means compares a ratio of the DC component to the modulation rate component of the received strength signal, said decision means controlling said attenuator to lower the gain of said receiver when the ratio is greater than a predetermined threshold level so that the output of said receiver may not be saturated, and said decision means deciding whether the received signal is optimum based on the output of said receiver as a result of the control.

9. A received signal decision apparatus as claimed in claim 1, wherein said decision means calculates, where a plurality of alternative signals are present to be received, a ratio of the modulation rate component to the DC component of the received strength signal and decides that one of the alternative signals whose ratio exhibits the lowest value is optimum.

10. A received signal decision apparatus for a digital modulated signal receiver, comprising:

a received signal strength detector for detecting a received signal strength corresponding to an envelope of a received signal;

a DC component extracting filter for extracting a DC component of the received strength signal;

a modulation rate component extracting filter for extracting a modulation rate component of the received strength signal; and a comparator for deciding whether the received signal is optimum based on the extracted DC component and the extracted modulation rate component of the received strength signal.

11. A received signal decision apparatus for a digital modulated signal receiver, comprising received signal strength detecting means for detecting a received signal strength corresponding to an envelope of a received signal and outputting a received strength signal, a DC component extracting filter for extracting a DC component of the received strength signal, a modulation rate component extracting filter for extracting a modulation rate component of the received strength signal, an attenuator provided at an input of said received signal strength detecting means, and a control means for controlling said attenuator in response to the DC component and the modulation rate component of the received strength signal, said control means continuously controlling the output of said attenuator in accordance with the value of a ratio of the DC component to the modulation rate component of the received strength signal so as to prevent saturation of the output of said receiver, said control means deciding based on the output of said receiver as a result of the control of said attenuator whether the received signal is optimum.

* * * * *